US010290216B1

(12) United States Patent
McCusker et al.

(10) Patent No.: US 10,290,216 B1
(45) Date of Patent: May 14, 2019

(54) SYSTEM FOR SYMBOLICALLY REPRESENTING TEXT-BASED OBSTACLE DATA ON AN ELECTRONIC MAP

(71) Applicant: Rockwell Collins, Inc., Cedar Rapids, IA (US)

(72) Inventors: Patrick D. McCusker, Walker, IA (US); Douglas A. Bell, Marion, IA (US); Sarah Barber, Cedar Rapids, IA (US); Michael J. Schmitt, Cedar Rapids, IA (US); Brent J. Nelson, Marion, IA (US); Travis S. Vanderkamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/973,732

(22) Filed: May 8, 2018

(51) Int. Cl.
*H04L 29/08* (2006.01)
*G08G 5/00* (2006.01)
*G06T 11/60* (2006.01)

(52) U.S. Cl.
CPC ............ *G08G 5/0021* (2013.01); *G06T 11/60* (2013.01); *G08G 5/0047* (2013.01)

(58) Field of Classification Search
CPC .... G08G 5/0021; G08G 5/0047; G06T 11/60; G06T 19/006
See application file for complete search history.

(56) References Cited

U.S. PATENT DOCUMENTS

| 8,862,381 B1* | 10/2014 | Ridl ...................... G08G 5/045 701/3 |
| 2006/0238402 A1* | 10/2006 | Khatwa ................ G01C 23/005 342/29 |
| 2008/0155007 A1* | 6/2008 | Launer ................ G06F 16/2358 709/201 |
| 2011/0264313 A1* | 10/2011 | Sampath .............. G08G 5/0013 701/16 |
| 2013/0162632 A1* | 6/2013 | Varga .................... G06T 19/006 345/419 |
| 2013/0261848 A1* | 10/2013 | Khatwa .................. G06Q 50/30 701/3 |
| 2017/0229023 A1* | 8/2017 | Connor ................. H04W 84/18 |
| 2017/0310749 A1* | 10/2017 | Vasek ................. H04L 65/1069 |
| 2018/0268718 A1* | 9/2018 | Srivastav ............... G08G 5/065 |
| 2018/0315324 A1* | 11/2018 | Singh ...................... G08G 5/04 |

* cited by examiner

*Primary Examiner* — An T Nguyen
(74) *Attorney, Agent, or Firm* — Angel N. Gerdzhikov; Donna P. Suchy; Daniel M. Barbieri (57) ABSTRACT

Systems and methods for symbolically representing text-based obstacle data on an electronic map are disclosed. In embodiments, a system includes a receiver in communication with a remote server. The receiver is configured to receive one or more textual communications from the remote server. The system further includes an aircraft display system with a display and a controller. The controller is in communication with the display, the receiver, and a memory. The controller is configured to generate an electronic map at the display based on map data retrieved from the memory, wherein the map data includes geographic information and predetermined obstacle information. The controller is further configured to receive the one or more textual communications from the receiver and update the electronic map to include one or more symbolic representations based on obstacle data derived from the one or more textual communications.

20 Claims, 10 Drawing Sheets

SYSTEM FOR SYMBOLICALLY REPRESENTING TEXT-BASED OBSTACLE DATA ON AN ELECTRONIC MAP

BACKGROUND

An aircraft or an aircraft control station may be equipped with at least one display that presents an electronic moving map. It is important to display updated obstacle information to flight crew members via the electronic moving map. Some systems use an onboard database of obstacles to identify the location of obstacles relative to the aircraft and represent those obstacles on the electronic moving map. These types of databases are typically updated on a 14 day cycle. However, it can take up to a year for new obstacles to make it into the database; temporary obstacles (e.g., cranes) may never make it into the database; and obstacles in the database may have temporary changes (e.g., loss of lighting on a tower). These types of deficiencies in the database are handled by Notice to Airmen (NOTAM) communications which provide text-based descriptions of new, temporary, or unlighted obstacles.

It is the responsibility of the flight crew to be aware of all NOTAM communications related to obstacles which are not currently represented in the obstacle database. For example, NOTAM communications may be printed out or communicated to a flight crew member's mobile device (e.g., smartphone, tablet, notebook computer, wearable device, media player, or the like). Consequently, the flight crew member is required to commit the information to memory or look back and forth between the electronic map display and the text-based descriptions of the NOTAM communications. There is a need for a system that integrates NOTAM communications and other obstacle data into one display that can be viewed by the flight crew.

SUMMARY

In an aspect, embodiments of the inventive concepts disclosed herein are directed to a system for symbolically representing text-based obstacle data on an electronic map. In embodiments, the system includes a receiver in communication with a remote server. The receiver is configured to receive one or more textual communications from the remote server. The system further includes an aircraft display system with a display and a controller. The controller is in communication with the display, the receiver, and a memory. The controller is configured to generate an electronic map at the display based on map data retrieved from the memory, wherein the map data includes geographic information and predetermined obstacle information. The controller is further configured to receive the one or more textual communications from the receiver and update the electronic map to include one or more symbolic representations based on obstacle data derived from the one or more textual communications.

In some embodiments, the one or more textual communications are communicated to a mobile device (e.g., smartphone, tablet, notebook computer, wearable device, media player, or the like). The controller may be in communication with the mobile device. The controller can be configured to receive the one or more textual communications from the mobile device and update the electronic map to include one or more symbolic representations based on obstacle data derived from the one or more textual communications.

In a further aspect, embodiments of the inventive concepts disclosed herein are directed to a method of symbolically representing text-based obstacle data on an electronic map. The method includes generating an electronic map at an aircraft display with a controller based on map data retrieved from a memory in communication with the controller, wherein the map data includes geographic information and predetermined obstacle information. The method further includes receiving one or more textual communications from a remote server with a receiver in communication with the controller and updating the electronic map to include one or more symbolic representations based on obstacle data derived from the one or more textual communications.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for symbolically representing text-based obstacle data on an electronic map. As noted herein, a typical aircraft display system may use a database of obstacles to identify the location of obstacles relative to an aircraft and represent those obstacles on an electronic map presented via a display of the aircraft display system. Deficiencies in the database can be handled by textual communications (e.g., Notice to Airmen (NOTAM) communications) which provide text-based descriptions of new, temporary, or unlighted obstacles. These textual communications may be printed out or communicated to a flight crew member's mobile device (e.g., smartphone, tablet, notebook computer, wearable device, media player, or the like). Consequently, the flight crew member may need to commit the information to memory or look back and forth between the electronic map display and the textual information. An object of the system and method disclosed herein is to retrieve textual (e.g., NOTAM) communications and symbolically represent text-based obstacle data derived from the textual communications on the same electronic map that is employed to present preloaded and/or server-based map data.

Figure 1A:
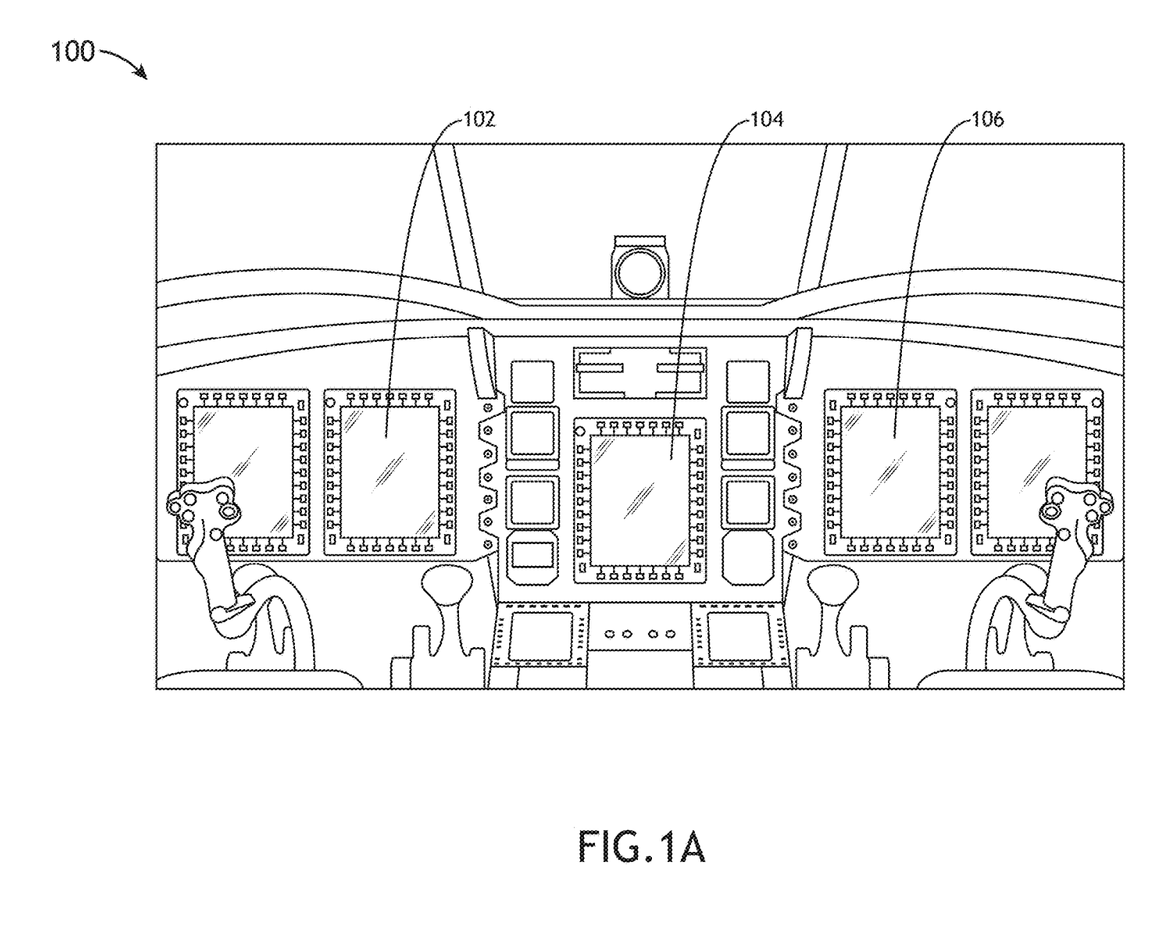
FIG. 1A is an illustration of an aircraft environment in which a system for symbolically representing text-based obstacle data on an electronic map may be implemented, in accordance with example embodiments of this disclosure.

FIG. 1A illustrates an example embodiment of an aircraft environment 100 in which a system and method for symbolically representing text-based obstacle data on an electronic map may be implemented. For example, the aircraft environment 100 (e.g., a cockpit) includes one or more displays that can be employed to present electronic maps. The aircraft environment 100 in FIG. 1A is shown to include at least one primary flight display 102 and at least one multi-function display 104 that are viewable by a flight crew member (e.g., pilot). In some embodiments, the aircraft environment 100 may further include at least one primary/secondary flight display 106 that is viewable by another flight crew member (e.g., co-pilot). The aircraft environment 100 illustrated in FIG. 1A illustrates an example embodiment. However, in other embodiments, the aircraft 100 environment can include any number of display devices (e.g., one, two, three, or more displays) including one or more primary flight displays, secondary flight displays, and/or multi-function displays.

Figure 1B:
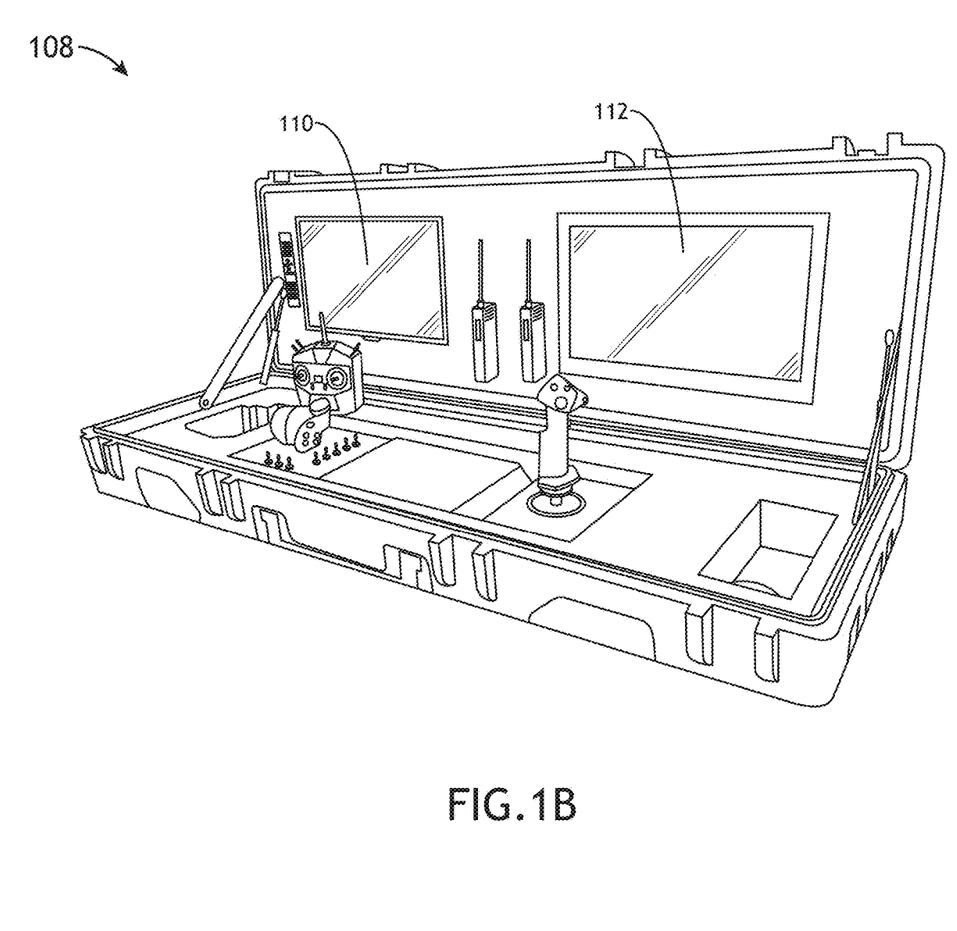
FIG. 1B is an illustration of an unmanned aerial vehicle (UAV) control station in which a system for symbolically representing text-based obstacle data on an electronic map may be implemented, in accordance with example embodiments of this disclosure.

The system and method for symbolically representing text-based obstacle data on an electronic map can also be implemented in unmanned aerial vehicle (UAV) systems. For example, FIG. 1B illustrates an example embodiment of a UAV control station 108 in which a system and method for symbolically representing text-based obstacle data on an electronic map may be implemented. The UAV control station 108 may include any number of displays. For example, the UAV control station 108 in FIG. 1B is shown to include a first display 110 and a second display 112. In some embodiments, the UAV control station 108 is portable (e.g., as illustrated in FIG. 1B). In other embodiments, the UAV control station 108 may be within a facility or a moving vehicle (e.g., van, truck, boat, other aircraft, etc.).

Figure 2A:
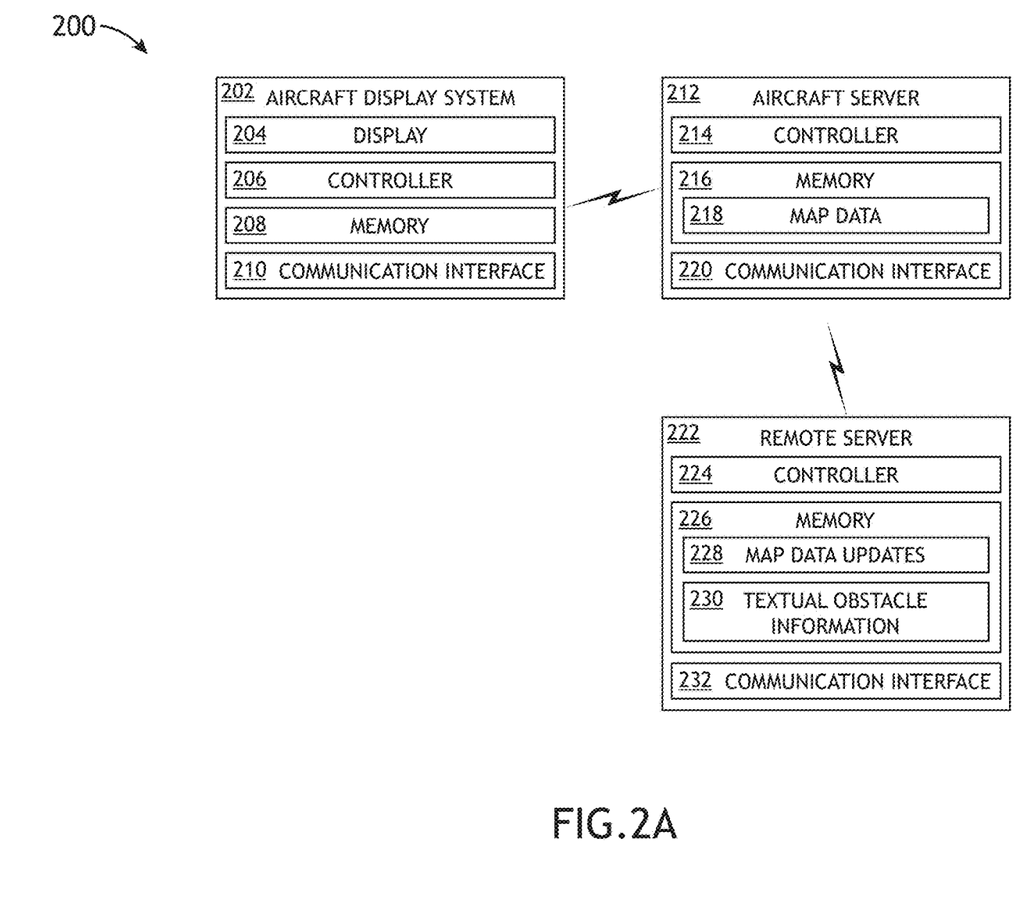
FIG. 2A is a block diagram illustrating a system for symbolically representing text-based obstacle data on an electronic map presented via a display of an aircraft display system, in accordance with example embodiments of this disclosure.
Figure 2B:
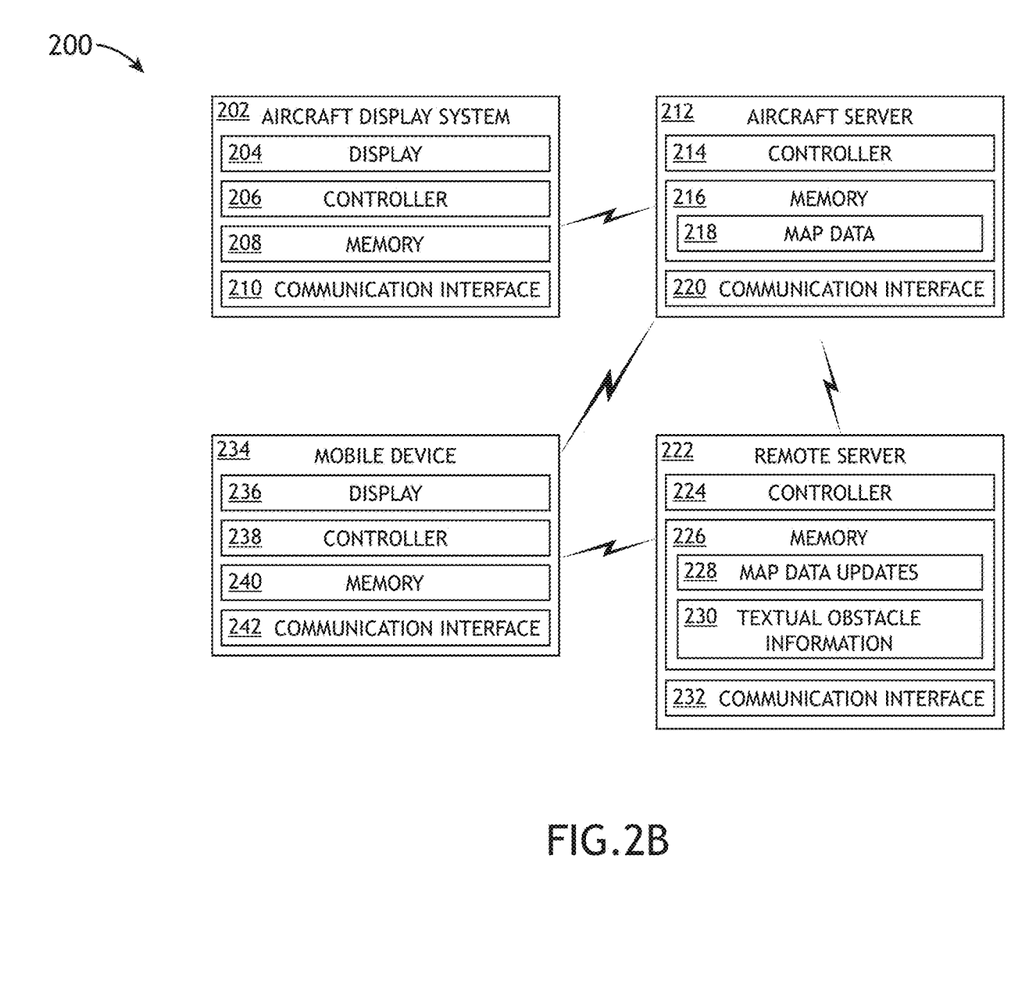
FIG. 2B is a block diagram illustrating a system for symbolically representing text-based obstacle data on an electronic map presented via a display of an aircraft display system, in accordance with example embodiments of this disclosure.

FIGS. 2A and 2B illustrate embodiments of a system 200 for symbolically representing text-based obstacle data on an electronic map. The system 200 includes an aircraft display system 202 having at least one display 204. For example, the display 204 may be a primary flight display (e.g., display 102 or 106), a multi-function display (e.g., display 104), or any other type of aircraft display (e.g., another onboard display, a UAV controller display 110/112, or the like). The aircraft display system 202 may further include a controller 206, memory 208, and a communications interface 210.

The controller 206 provides processing functionality for at least the aircraft display system 202 and can include any number of processors, micro-controllers, circuitry, field programmable gate array (FPGA) or other processing systems, and resident or external memory for storing data, executable code, and other information accessed or generated by the aircraft display system 202. The controller 206 can execute one or more software programs embodied in a non-transitory computer readable medium (e.g., memory 208) that implement techniques described herein. The controller 206 is not limited by the materials from which it is formed or the processing mechanisms employed therein and, as such, can be implemented via semiconductor(s) and/or transistors (e.g., using electronic integrated circuit (IC) components), and so forth.

The memory 208 can be an example of tangible, computer-readable storage medium that provides storage functionality to store various data and/or program code associated with operation of the aircraft display system 202/ controller 206, such as software programs and/or code segments, or other data to instruct the controller 206, and possibly other components of the aircraft display system 202, to perform the functionality described herein. Thus, the memory 208 can store data, such as a program of instructions for operating the aircraft display system 202, including its components (e.g., display 204, controller 206, communication interface 210, etc.), and so forth. It should be noted that while a single memory 208 is described, a wide variety of types and combinations of memory (e.g., tangible, non-transitory memory) can be employed. The memory 208 can be integral with the controller 206, can comprise stand-alone memory, or can be a combination of both. Some examples of the memory 208 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 210 can be operatively configured to communicate with components of the aircraft display system 202. For example, the communication interface 210 can be configured to retrieve data from the controller 206 or other devices (e.g., aircraft server 212, remote server 222, and/or mobile device 234), transmit data for storage in the memory 208, retrieve data from storage in the memory 208, and so forth. The communication interface 210 can also be communicatively coupled with the controller 206 to facilitate data transfer between components of the aircraft display system 202 and the controller 206. It should be noted that while the communication interface 210 is described as a component of the aircraft display system 202, one or more components of the communication interface 210 can be implemented as external components communicatively coupled to the aircraft display system 202 via a wired and/or wireless connection. The aircraft display system 202 can also include and/or connect to one or more input/output (I/O) devices (e.g., via the communication interface 210), such as display 204, a mouse, a trackball, a trackpad, a joystick, a line select device, a touchpad, a touchscreen, a keyboard, a keypad, a microphone (e.g., for voice commands) and so on. In embodiments, the communication interface 210 includes or is coupled to a transmitter, receiver, transceiver, physical connection interface, or any combination thereof.

The communication interface 210 may facilitate connectivity between the aircraft display system 202 and an aircraft server 212. For example, the communication interface 210 can be configured to communicate directly with the aircraft server 212 (e.g., via an ad-hoc connection), or may be configured to communicate with the aircraft server 212 over a network (e.g., a wired/wireless network).

The communication interface 210 may facilitate connectivity between the aircraft display system 202 and a remote server 222. For example, the communication interface 210 can be configured to receive wireless communications from the remote server 222 (e.g., over an internet connection, cellular communications link, satellite communications link, or the like). In some embodiments, the connectivity between the aircraft display system 202 and the remote server 222 is at least partially established by the aircraft server 212. For example, the aircraft server 212 may be configured to communicate with the remote server 222 (during or prior to flight) and configured to communicate data and/or display signals to the aircraft display system 202 based on data received from the remote server 222. In some embodiments, the connectivity between the aircraft display system 202 and the remote server 222 is at least partially established by a mobile device 234 (e.g., smartphone, tablet, notebook computer, wearable device, media player, or the like). For example, the mobile device 234 may be configured to communicate with the remote server 222 (during or prior to flight) and configured to communicate data to the aircraft display system 202 based on data received from the remote server 222. In some embodiments, the mobile device 234 may be configured to communicate with the remote server 222 (during or prior to flight) and configured to communicate data to the aircraft server 212 based on data received from the remote server 222, where the aircraft server 212 is configured to communicate data and/or display signals to the aircraft display system 202 based on data received from the mobile device 234.

In embodiments, the aircraft server 212 includes a controller 214, memory 216, and a communication interface 220. The controller 214 provides processing functionality for at least the aircraft server 212 and can include any number of processors, micro-controllers, circuitry, field programmable gate array (FPGA) or other processing systems, and resident or external memory for storing data, executable code, and other information accessed or generated by the aircraft server 212. The controller 214 can execute one or more software programs embodied in a non-transitory computer readable medium (e.g., memory 216) that implement techniques described herein. The controller 214 is not limited by the materials from which it is formed or the processing mechanisms employed therein and, as such, can be implemented via semiconductor(s) and/or transistors (e.g., using electronic integrated circuit (IC) components), and so forth.

The memory 216 can be an example of tangible, computer-readable storage medium that provides storage functionality to store various data (e.g., map data 218) and/or program code associated with operation of the aircraft server 212/controller 214, such as software programs and/or code segments, or other data to instruct the controller 214, and possibly other components of the aircraft server 212, to perform the functionality described herein. Thus, the memory 216 can store data, such as a program of instructions for operating the aircraft server 212, including its components (e.g., controller 214, communication interface 220, etc.), and so forth. It should be noted that while a single memory 216 is described, a wide variety of types and combinations of memory (e.g., tangible, non-transitory memory) can be employed. The memory 216 can be integral with the controller 214, can comprise stand-alone memory, or can be a combination of both. Some examples of the memory 216 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 220 can be operatively configured to communicate with components of the aircraft server 212. For example, the communication interface 220 can be configured to retrieve data from the controller 214 or other devices (e.g., aircraft display system 202, remote server 222, and/or mobile device 234), transmit data for storage in the memory 216, retrieve data from storage in the memory 216, and so forth. The communication interface 220 can also be communicatively coupled with the controller 214 to facilitate data transfer between components of the aircraft server 212 and the controller 214. It should be noted that while the communication interface 220 is described as a component of the aircraft server 212, one or more components of the communication interface 220 can be implemented as external components communicatively coupled to the aircraft server 212 via a wired and/or wireless connection. The aircraft server 212 can also include and/or connect to one or more input/output (I/O) devices (e.g., via the communication interface 220), such as a display, a mouse, a trackball, a trackpad, a joystick, a line select device, a touchpad, a touchscreen, a keyboard, a keypad, a microphone (e.g., for voice commands) and so on. In embodiments, the communication interface 220 includes or is coupled to a transmitter, receiver, transceiver, physical connection interface, or any combination thereof.

In embodiments, the remote server 222 also includes a controller 224, memory 226, and a communication interface 232. The controller 224 provides processing functionality for at least the remote server 222 and can include any number of processors, micro-controllers, circuitry, field programmable gate array (FPGA) or other processing systems, and resident or external memory for storing data, executable code, and other information accessed or generated by the remote server 222. The controller 224 can execute one or more software programs embodied in a non-transitory computer readable medium (e.g., memory 226) that implement techniques described herein. The controller 224 is not limited by the materials from which it is formed or the processing mechanisms employed therein and, as such, can be implemented via semiconductor(s) and/or transistors (e.g., using electronic integrated circuit (IC) components), and so forth.

The memory 226 can be an example of tangible, computer-readable storage medium that provides storage functionality to store various data (e.g., map data updates 228 and/or textual obstacle information 230 (e.g., NOTAM information)) and/or program code associated with operation of the remote server 222/controller 224, such as software programs and/or code segments, or other data to instruct the controller 224, and possibly other components of the remote server 222, to perform the functionality described herein. Thus, the memory 226 can store data, such as a program of instructions for operating the remote server 222, including its components (e.g., controller 224, communication interface 232, etc.), and so forth. It should be noted that while a single memory 226 is described, a wide variety of types and combinations of memory (e.g., tangible, non-transitory memory) can be employed. The memory 226 can be integral with the controller 224, can comprise stand-alone memory, or can be a combination of both. Some examples of the memory 226 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 232 can be operatively configured to communicate with components of the remote server 222. For example, the communication interface 232 can be configured to retrieve data from the controller 224 or other devices (e.g., aircraft display system 202, aircraft server 212, and/or mobile device 234), transmit data for storage in the memory 226, retrieve data from storage in the memory 226, and so forth. The communication interface 232 can also be communicatively coupled with the controller 224 to facilitate data transfer between components of the remote server 222 and the controller 224. It should be noted that while the communication interface 232 is described as a component of the remote server 222, one or more components of the communication interface 232 can be implemented as external components communicatively coupled to the remote server 222 via a wired and/or wireless connection. The remote server 222 can also include and/or connect to one or more input/output (I/O) devices (e.g., via the communication interface 232), such as a display, a mouse, a trackball, a trackpad, a joystick, a line select device, a touchpad, a touchscreen, a keyboard, a keypad, a microphone (e.g., for voice commands) and so on. In embodiments, the communication interface 232 includes or is coupled to a transmitter, receiver, transceiver, physical connection interface, or any combination thereof.

In embodiments, the mobile device 234 includes a display 236, a controller 238, memory 240, and a communication interface 242. The controller 238 provides processing functionality for at least the mobile device 234 and can include any number of processors, micro-controllers, circuitry, field programmable gate array (FPGA) or other processing systems, and resident or external memory for storing data, executable code, and other information accessed or generated by the mobile device 234. The controller 238 can execute one or more software programs embodied in a non-transitory computer readable medium (e.g., memory 240) that implement techniques described herein. The controller 238 is not limited by the materials from which it is formed or the processing mechanisms employed therein and, as such, can be implemented via semiconductor(s) and/or transistors (e.g., using electronic integrated circuit (IC) components), and so forth.

The memory 240 can be an example of tangible, computer-readable storage medium that provides storage functionality to store various data (e.g., map data updates 228 and/or textual obstacle information 230 (e.g., NOTAM information) received from the remote server 222) and/or program code associated with operation of the mobile device 234/controller 238, such as software programs and/or code segments, or other data to instruct the controller 238, and possibly other components of the mobile device 234, to perform the functionality described herein. Thus, the memory 240 can store data, such as a program of instructions for operating the mobile device 234, including its components (e.g., display 234, controller 238, communication interface 242, etc.), and so forth. It should be noted that while a single memory 240 is described, a wide variety of types and combinations of memory (e.g., tangible, non-transitory memory) can be employed. The memory 240 can be integral with the controller 238, can comprise stand-alone memory, or can be a combination of both. Some examples of the memory 240 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 242 can be operatively configured to communicate with components of the mobile device 234. For example, the communication interface 242 can be configured to retrieve data from the controller 238 or other devices (e.g., aircraft display system 202, aircraft server 212, and/or remote server 222), transmit data for storage in the memory 240, retrieve data from storage in the memory 240, and so forth. The communication interface 242 can also be communicatively coupled with the controller 238 to facilitate data transfer between components of the mobile device 234 and the controller 238. It should be noted that while the communication interface 242 is described as a component of the mobile device 234, one or more components of the communication interface 242 can be implemented as external components communicatively coupled to the mobile device 234 via a wired and/or wireless connection. The mobile device 234 can also include and/or connect to one or more input/output (I/O) devices (e.g., via the communication interface 242), such as display 236, a mouse, a trackball, a trackpad, a joystick, a line select device, a touchpad, a touchscreen, a keyboard, a keypad, a microphone (e.g., for voice commands) and so on. In embodiments, the communication interface 242 includes or is coupled to a transmitter, receiver, transceiver, physical connection interface, or any combination thereof.

Figure 4:
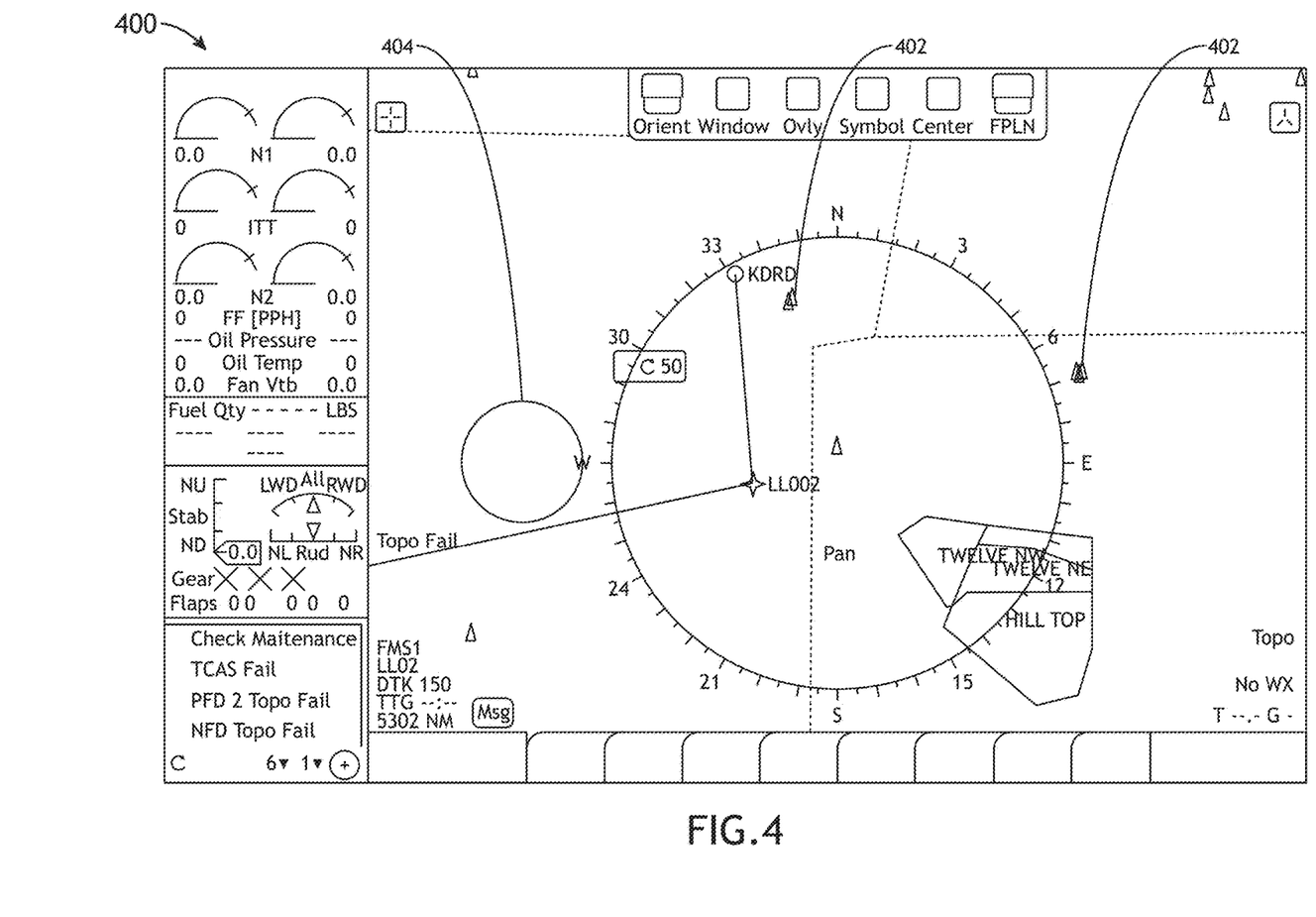
FIG. 4 is an electronic map that can be presented via a display of an aircraft display system, such as the aircraft display system illustrated in FIGS. 2A and 2B, wherein the electronic map includes one or more symbolic representations based on obstacle data derived from one or more textual communications, in accordance with example embodiments of this disclosure.
Figure 5A:
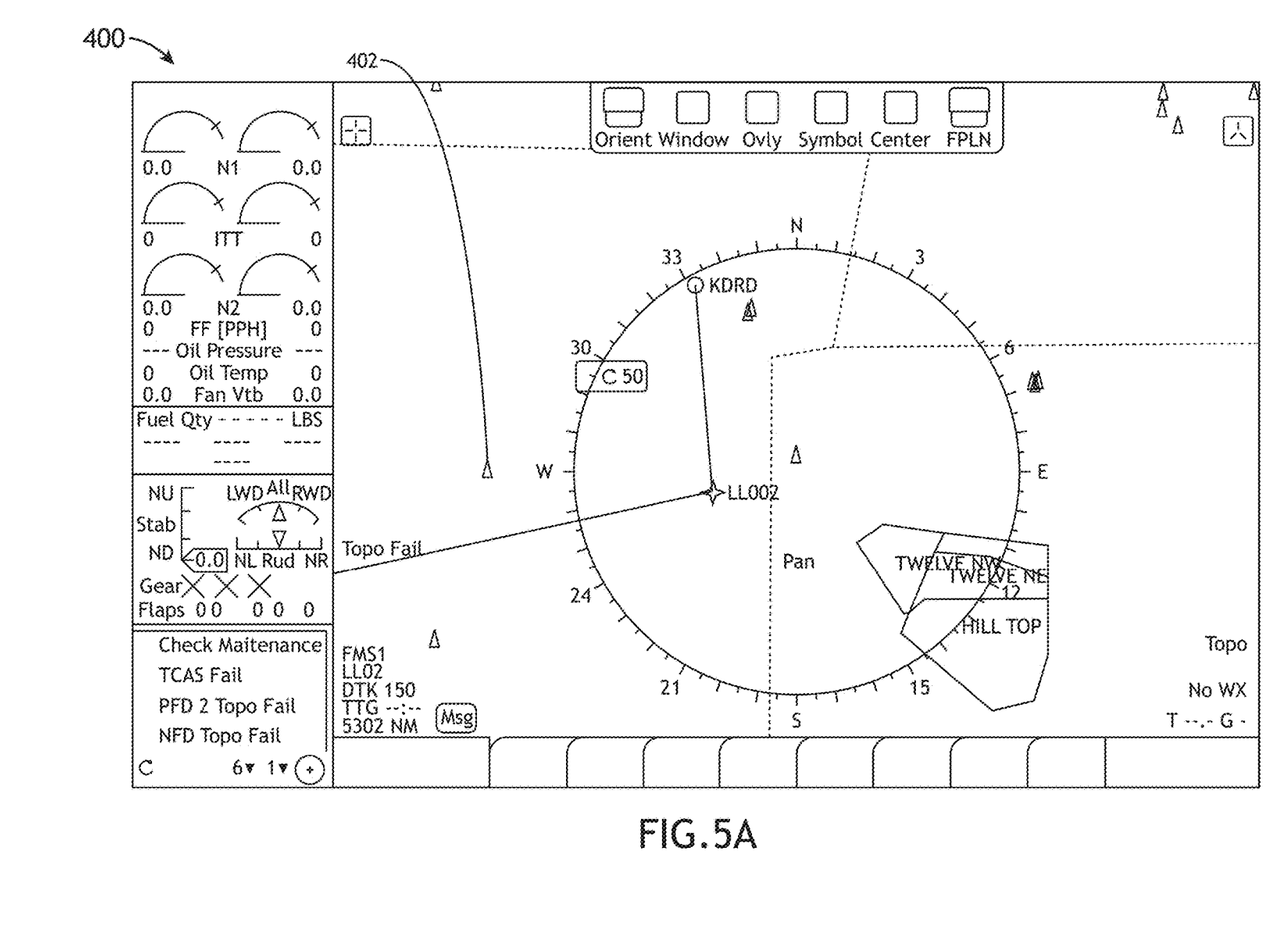
FIG. 5A is an electronic map that can be presented via a display of an aircraft display system, such as the aircraft display system illustrated in FIGS. 2A and 2B, in accordance with example embodiments of this disclosure.
Figure 5B:
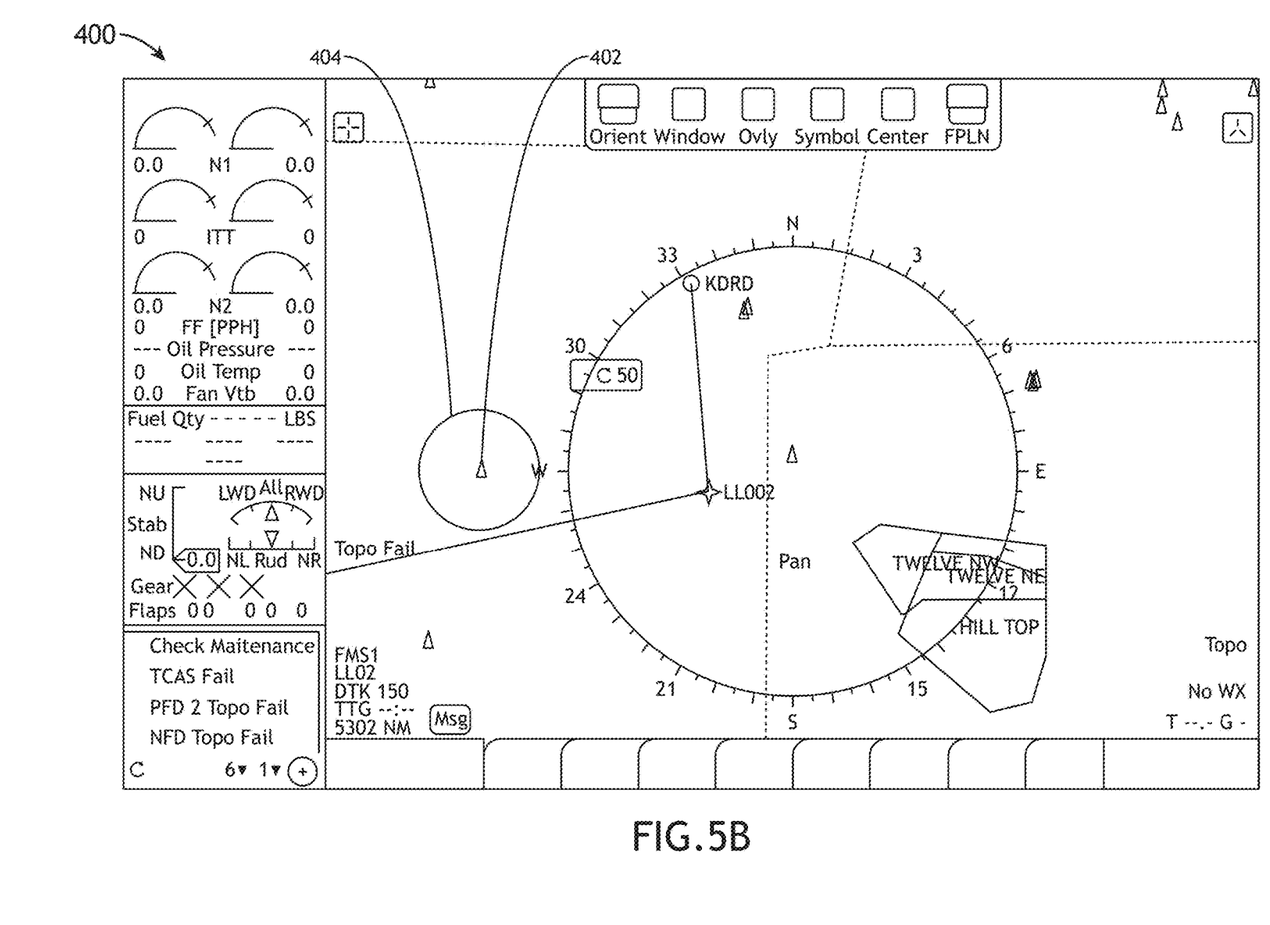
FIG. 5B is an electronic map that can be presented via a display of an aircraft display system, such as the aircraft display system illustrated in FIGS. 2A and 2B, wherein the electronic map includes one or more symbolic representations based on obstacle data derived from one or more textual communications, wherein a symbolic representation at least partially surrounds a preexisting symbolic representation on the electronic map, in accordance with example embodiments of this disclosure.
Figure 6:
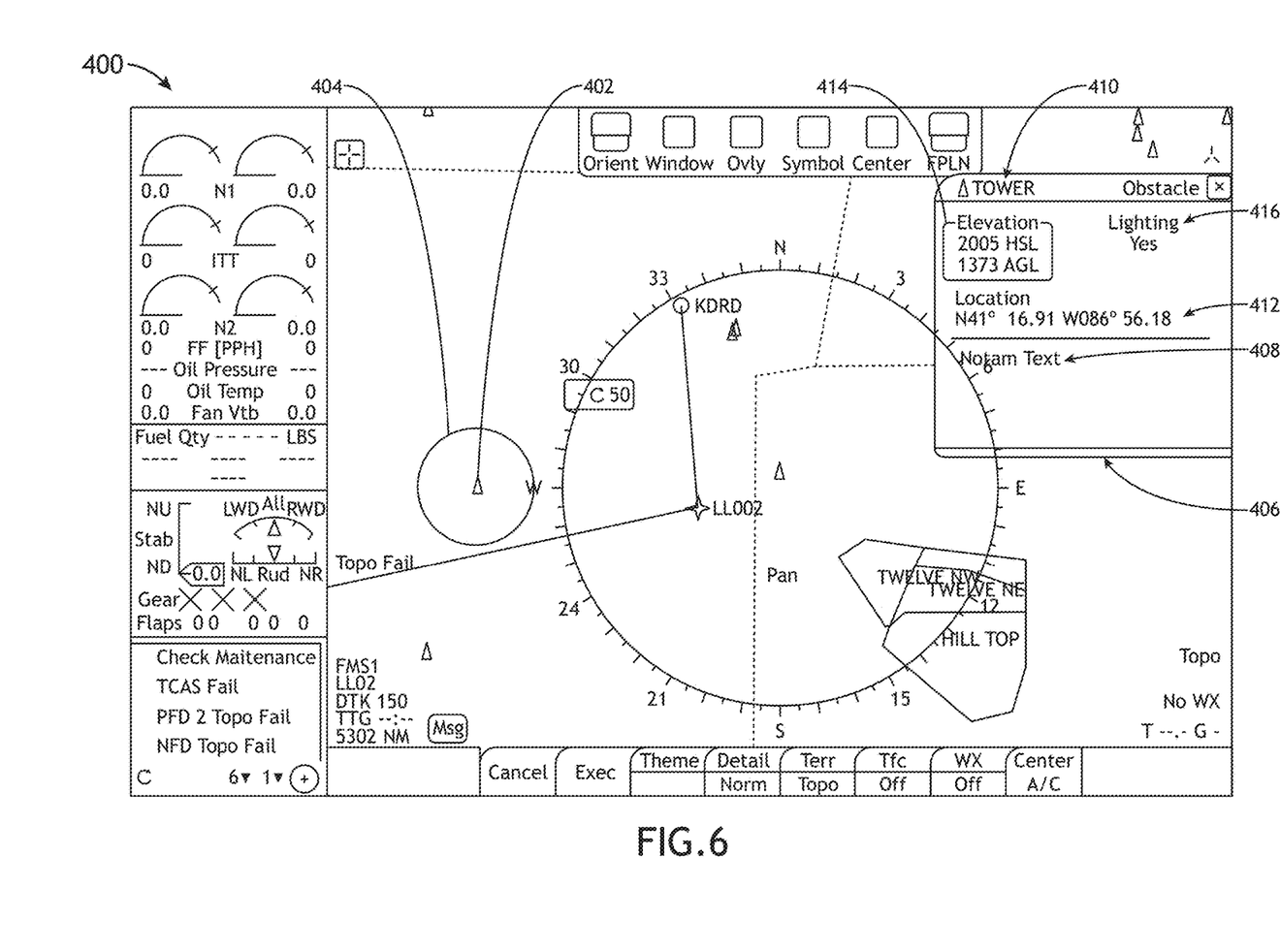
FIG. 6 is an electronic map that can be presented via a display of an aircraft display system, such as the aircraft display system illustrated in FIGS. 2A and 2B, wherein the electronic map includes one or more symbolic representations based on obstacle data derived from one or more textual communications, wherein a symbolic representation is selectable to view the one or more textual communications and/or the obstacle data derived from the one or more textual communications for an object indicated by the symbolic representation, in accordance with example embodiments of this disclosure.

The aircraft display system 202 is configured to present an electronic map, such as the electronic map 400 illustrated in FIGS. 4 through 6, via the display 204. In embodiments, the electronic map 400 is a moving electronic map. For example, the electronic map may be referenced to a predetermined reference point, a selected reference point, a reference point on the aircraft (e.g., nose, center, or tail of the aircraft), a pilot point of view, or an unmanned aerial vehicle point of view (e.g., camera location), or the like. In some embodiments, the electronic map 400 is a two-dimensional moving map, a three-dimensional moving map and/or a synthetic vision moving map. For example, the electronic map 400 may include three-dimensional topographical and obstacle representations.

The controller 206 may be configured to generate the electronic map 400 at the display 204 based on map data 218 retrieved from memory 208 and/or memory 216. For example, in an embodiment, the controller 206 is configured to receive the map data 218 from the aircraft server 212 and store the map data 218 in memory 208, where the controller 206 is then configured to generate the electronic map 400 at the display 204 based on the map data 218. In another embodiment, the map data 218 is preloaded in the memory 208 of the aircraft display system 202, and the controller 206 may be configured to generate the electronic map 400 at the display 204 with/without communicating with the aircraft server 212. In yet another embodiment, the controller 214 of the aircraft server 212 is configured to transmit instructions and/or display signals based on the map data 218 to the aircraft display system 202 that cause the controller 206 to generate the electronic map 400 at the display 204.

The map data 218 may include, but is not limited to, geographic information (e.g., geographical maps, topographical maps, satellite imagery, etc.), predetermined obstacle information (e.g., stored obstacle coordinates, elevations, types, statuses, etc.), flight plans or paths, and so forth. In some embodiments, the aircraft display system 202 and/or the aircraft server 212 can be configured to receive map data updates 228 from the remote server 222. For example, the remote server 222 may be configured to periodically update the map data 218 stored in the memory 216 of the aircraft server 212 or the memory 208 of the aircraft display system 202 with map data updates 228 on the remote server 222. The map data 218 may be updated on a schedule (e.g., daily, weekly, monthly, quarterly, yearly, or the like) or on demand (e.g., manually). Typically, updates will occur on ground (prior to flight), but in some instances, the remote server 222 may be configured to transmit map data updates 228 during flight. In other embodiments, the map data 218 stored by the aircraft display system 202 and/or the aircraft server 212 can be updated via portable media (e.g., flash drive, thumb drive, USB drive, external hard drive, memory card (e.g., SD-card), CD/DVD, or the like).

Figure 3A:
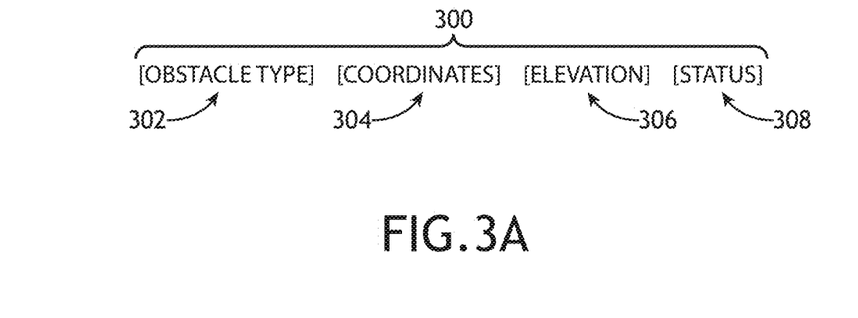
FIG. 3A illustrates a format for a textual communication, in accordance with example embodiments of this disclosure.

The map data 218 and map data updates 228 may include databases that are periodically updated (e.g., on a 14 day cycle). In many cases, it can take up to a year for new obstacles to make it into the database; temporary obstacles (e.g., cranes) may never make it into the database; and obstacles in the database may have temporary status changes (e.g., loss of lighting on a tower) that are not noted in the map data 218 or map data updates 228. These deficiencies are handled by textual communications (e.g., Notice to Airmen (NOTAM) communications) which provide text-based descriptions of new, temporary, or unlighted obstacles. For example, as shown in FIG. 3A, a textual communication 300 (e.g., a NOTAM communication, or the like) includes textual information (e.g., strings/fields of text), such as, but not limited to, obstacle type 302, obstacle coordinates 304, obstacle elevation/height 306, and/or obstacle status 308.

Figure 3B:
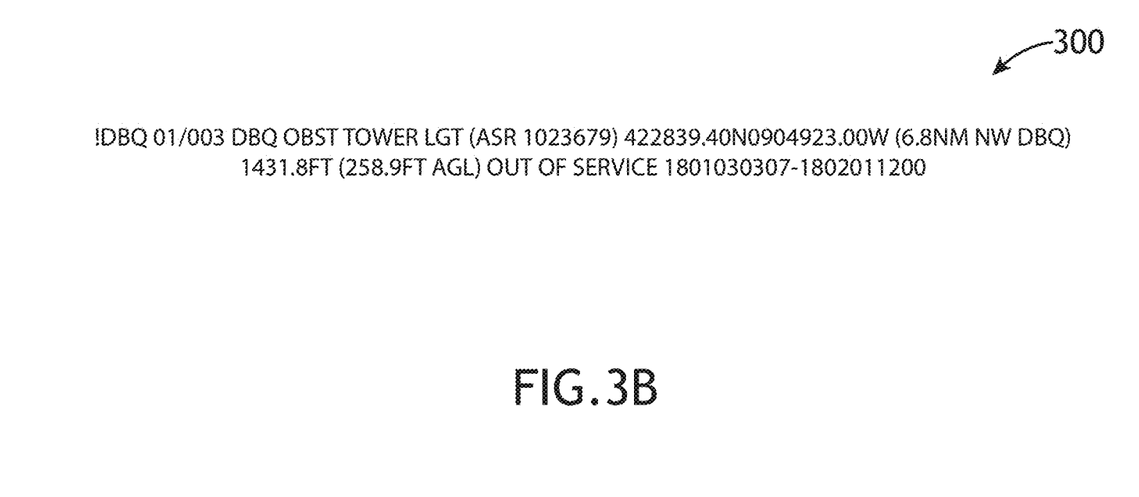
FIG. 3B is an example of a textual communication with the format illustrated in FIG. 3A.

FIG. 3B shows an example a textual communication 300 in the format of a NOTAM communication. NOTAMs are string-based text messages which use a highly structured format to represent a variety of information that a flight crew must be aware of. Obstacle-related NOTAMs provide all necessary information regarding an obstacle within a condensed format. The textual communication 300 in FIG. 3B is an example NOTAM for an obstacle (a tower) with an out-of-service the lighting system. The example in FIG. 3B is provided for illustrative purposes only, and it is to be understood that any other type of obstacle with any other type of status, coordinates, elevations, etc., can be indicated in a similar (e.g., NOTAM) format as the textual communication 300 in FIG. 3B. Furthermore, in some implementations, the textual communications 300 may be replaced with digital NOTAM communications, or the like. For example, the system 200 may employ communications in a digital (e.g., computer-readable, but otherwise illegible) format, such as a min-database format, or the like.

The remote server 222 (or any other on-ground computer/server) may be configured to generate the textual communications 300 based on textual obstacle information 230 at the remote server 222 (e.g., in memory 226). In an embodiment, the remote server 222 is configured to transmit the textual communications 300 to the aircraft display system 202 and/or the aircraft server 212. For example, the remote server 222 can transmit one or more textual communications 300 to the aircraft display system 202 and/or the aircraft server 212 prior to or during flight. In another embodiment, the remote server 222 is configured to transmit the textual communications 300 to the mobile device 234, and the mobile device 234 can then transmit the textual communications 300 or obstacle data (e.g., obstacle type 302, obstacle coordinates 304, obstacle elevation/height 306, and/or obstacle status 308) derived from the textual communications 300 to the aircraft display system 202 and/or the aircraft server 212.

In general, the textual communications 300 may be brought to the airborne system by a variety of means. For example, electronic text messages may be delivered to an application hosted by the aircraft server 212 via a Gatelink communication system (e.g., using commercial Wi-Fi or cellular communications technology). Alternatively, the electronic text messages may be first retrieved by an application hosted by the mobile device 234 and then uploaded into the application hosted on the aircraft server 212. For example, a pilot may have retrieved the messages before bringing the mobile device 234 to the aircraft, or the pilot may use a Gatelink communication system to retrieve the electronic text messages while on the aircraft. Other options for delivering electronic text messages to the airborne server may be used as well.

After receiving the one or more textual communications 300 or obstacle data derived from the textual communications 300, the aircraft display system 202 and/or the aircraft server 212 is configured to update the electronic map 400 to include one or more symbolic representations based on obstacle data (e.g., obstacle type 302, obstacle coordinates 304, obstacle elevation/height 306, and/or obstacle status 308). For example, in FIG. 4, the electronic map 400 includes symbolic representations 402 (e.g., triangles) indicating obstacle coordinates based on predetermined obstacle information (e.g., based on the map data 218) and one or more symbolic representations 404 (e.g., circles) indicating obstacle coordinates based on the obstacle data derived from the one or more textual communications 300. In an embodiment, the controller 206 of the aircraft display system 202 is configured to update the electronic map 400 at the display 204 based on the one or more textual communications 300 or obstacle data derived from the textual communications 300. In another embodiment, the controller 214 of the aircraft server 212 is configured to update the electronic map 400 based on the one or more textual communications 300 or obstacle data derived from the textual communications 300 and transmit instructions and/or display signals to the aircraft display system 202 that cause the controller 206 to generate the updated electronic map 400 at the display 204.

In some embodiments, the hosted application at the aircraft server 212 or the mobile device 234 is configured to interpret a textual communications 300 and/or extract the obstacle coordinates, dates that the obstacle notification (e.g., NOTAM) is in effect, obstacle type, elevation, status, and/or any other information embedded in the textual communication 300. The obstacle coordinates may be used to compute the position of the obstacle relative to the aircraft and to draw a symbolic representation 404 associated with the obstacle on the electronic map 400.

As shown in FIG. 4, the symbolic representation 404 based on the textual communication 300 can overlay or at least partially surround the obstacle coordinates 304 on the electronic map 400. In some instances, the obstacle coordinates 304 derived from the textual communication 300 are the same as or near to obstacle coordinates of an object noted the predetermined obstacle information (e.g., the map data 218). FIGS. 5A and 5B illustrate an example of such a situation, where the original electronic map 400 (FIG. 5A) includes a preexisting symbolic representation 402 based on predetermined obstacle information in the map data 218, and the updated electronic map 400 (FIG. 5B) includes a symbolic representation 404 based on obstacle data derived from the textual communication 300 that at least partially surrounds the preexisting symbolic representation 402 on the electronic map 400. Such a situation may occur for a variety of reasons, such as when an object associated with the textual communication 300 is located near an object that has been noted in the map data 218, or when an obstacle that has already been noted in the map data 218 has a change in status (e.g., tower light goes out).

For simplicity, the system 200 can keep old (preexisting) symbolic representations 402 on the electronic map 400 when the electronic map 400 is updated to include the symbolic representations 404 based on the one or more textual communications 300. Additionally, the symbolic representations 404 may be selectable to view additional information, such as the text of the one or more textual communications or the obstacle data derived from the one or more textual communications for the object. In this manner, a flight crew member (e.g., pilot), can select the symbolic representation 404 to determine whether it is associated with a new obstacle (e.g., an obstacle that is not associated with a preexisting symbolic representation 402) or a change in status pertaining to an old obstacle (e.g., an obstacle that has a preexisting symbolic representation 402). FIG. 6 illustrates an example embodiment of the electronic map 400, where the symbolic representation 404 has been selected to view additional information. In some embodiments, the additional information is presented in window 406 (e.g., a pop-up text box) that is adjacent to or at least partially overlaying a portion of the electronic map 400. The information window 406 can include textual information including, but not limited to: the text 408 of the one or more textual communications 300; the object type 410; coordinates 412; elevation 414; and/or status 416. The window 406 may further include database information for all preexisting obstacle symbolic representations 402 enclosed by the symbolic representation 404 associated with the one or more textual communications 300. In such instances, the flight crew member (e.g., pilot) can associate the text 408 from the textual (e.g., NOTAM) communication 300 to any correlated obstacle information extracted from the database.

The color of the symbolic representation 404 associated with the textual communications 300 may differ from the color used for other (preexisting) obstacle symbols 402 to highlight that the symbolic representation 404 is interactive. It is noted that display color schemes tend to be different between aircraft types based upon the human factors philosophy of each aircraft manufacturer. So the color used to indicate that the symbolic representation 404 is interactive will likely differ from one aircraft type to another.

The size and shape of the symbolic representations 404 may be determined by the range of the underlying electronic map 400. For example, at long map ranges, the symbolic representation 404 may include a relatively small circle (or rectangle, pentagon, hexagon, or the like) to prevent the circle from enclosing many preexisting symbolic representations 402. For further example, at short map ranges, the symbolic representation 404 may include a relatively large circle to ensure that any correlated database obstacle is enclosed by the circle.

Figure 7:
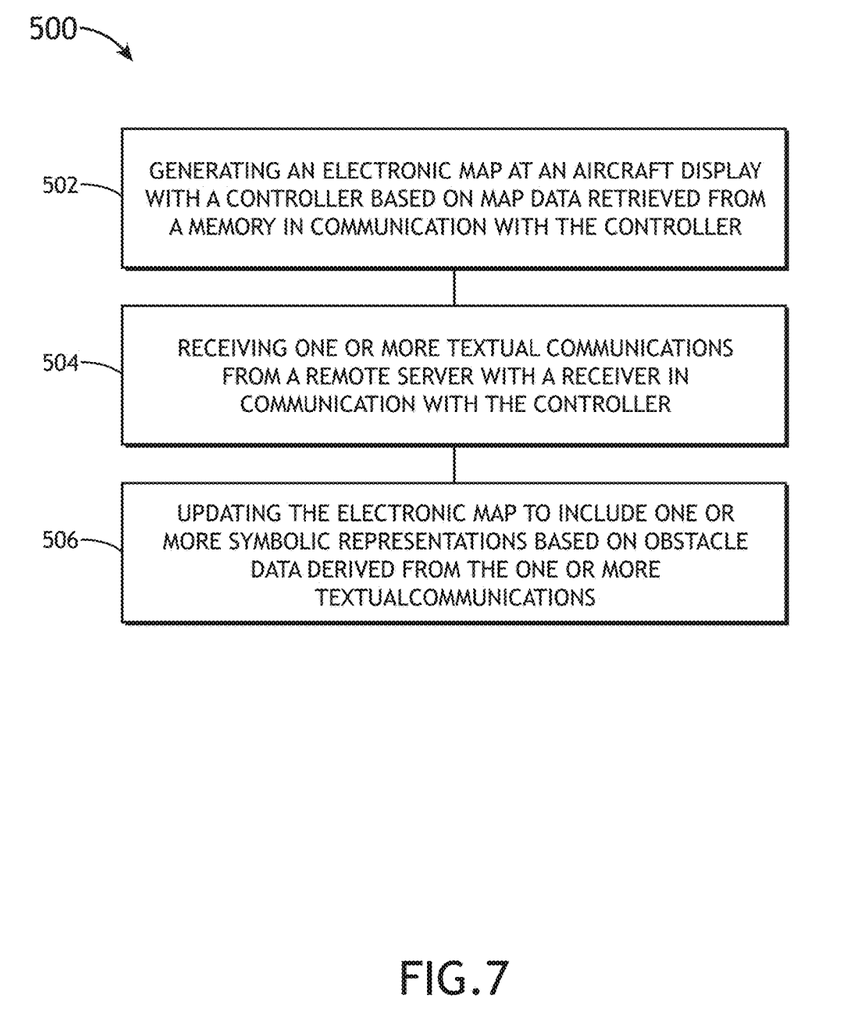
FIG. 7 is a flow diagram illustrating an example implementation of a method for symbolically representing text-based obstacle data on an electronic map.

FIG. 7 illustrates an example implementation of a method 500 that employs a system, such as the system 200 illustrated in FIGS. 2A and 2B, to symbolically represent obstacle data derived from textual (e.g., NOTAM) communications on an electronic map presented by an aircraft display. In general, operations of disclosed processes (e.g., method 500) may be performed in an arbitrary order, unless otherwise provided in the claims. The method 500 includes generating an electronic map 400 at an aircraft display 204 with a controller 206/214 based on map data 218 retrieved from a memory 208/216 in communication with the controller 206/214 (block 502). The method 500 further includes receiving one or more textual communications 300 from a remote server 222 with a receiver (e.g., with communication interface 210/220 or mobile device 234) in communication with the controller 206/214 (block 504). The electronic map (e.g., map 400) at the display is then updated to include one or more symbolic representations 404 based on obstacle data (e.g., obstacle type 302, obstacle coordinates 304, obstacle elevation/height 306, and/or obstacle status 308) derived from the one or more textual communications 300 (block 506). The method 500 may further include any step or operation implied or required by the embodiments of system 200 described herein.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for symbolically representing text-based obstacle data on an electronic map, comprising:
   a receiver in communication with a remote server, the receiver configured to receive one or more textual communications from the remote server; and
   an aircraft display system including a display and a controller, the controller being in communication with the display, the receiver, and a memory, the controller configured to:
   generate an electronic map at the display based on map data retrieved from the memory, the map data including geographic information and predetermined obstacle information;
   receive the one or more textual communications from the receiver, wherein the one or more textual communications include textual information indicating obstacle coordinates for an object; and
   update the electronic map to include one or more symbolic representations based on obstacle data derived from the one or more textual communications by generating a symbolic representation that overlays or at least partially surrounds the obstacle coordinates on the electronic map, wherein the symbolic representation at least partially surrounds a preexisting symbolic representation on the electronic map when the map data includes predetermined obstacle information for the object.

2. The system of claim 1, wherein the electronic map comprises at least one of a two-dimensional moving map, a three-dimensional moving map or a synthetic vision moving map.

3. The system of claim 1, wherein the electronic map is referenced to at least one of a predetermined reference point, a selected reference point, a reference point on the aircraft, a pilot point of view, or an unmanned aerial vehicle point of view.

4. The system of claim 1, wherein the one or more textual communications comprise notice to airmen (NOTAM) communications.

5. The system of claim 1, wherein the one or more textual communications further include textual information indicating at least one of obstacle elevation, type of obstacle, or obstacle status for the object.

6. The system of claim 1, wherein the symbolic representation is selectable to view at least one of the one or more textual communications or the obstacle data derived from the one or more textual communications for the object.

7. The system of claim 1, wherein the display comprises at least one of a primary flight display, a multi-function aircraft display, or an unmanned aerial vehicle controller display.

8. A system for symbolically representing text-based obstacle data on an electronic map, comprising:
   a mobile device configured to receive one or more textual communications; and
   an aircraft display system including a display and a controller, the controller being in communication with the display, the mobile device, and a memory, the controller configured to:
   generate an electronic map at the display based on map data retrieved from the memory, the map data including geographic information and predetermined obstacle information;
   receive the one or more textual communications from the mobile device, wherein the one or more textual communications include textual information indicating obstacle coordinates for an object; and update the electronic map to include one or more symbolic representations based on obstacle data derived from the one or more textual communications by generating a symbolic representation that overlays or at least partially surrounds the obstacle coordinates on the electronic map, wherein the symbolic representation at least partially surrounds a preexisting symbolic representation on the electronic map when the map data includes predetermined obstacle information for the object.

9. The system of claim 8, wherein the electronic map comprises at least one of a two-dimensional moving map, a three-dimensional moving map or a synthetic vision moving map.

10. The system of claim 8, wherein the one or more textual communications comprise notice to airmen (NOTAM) communications.

11. The system of claim 8, wherein the one or more textual communications further include textual information indicating at least one of obstacle elevation, type of obstacle, or obstacle status for the object.

12. The system of claim 8, wherein the symbolic representation is selectable to view at least one of the one or more textual communications or the obstacle data derived from the one or more textual communications for the object.

13. The system of claim 8, wherein the display comprises at least one of a primary flight display, a multi-function aircraft display, or an unmanned aerial vehicle controller display.

14. A method of symbolically representing text-based obstacle data on an electronic map, comprising:
   generating an electronic map at an aircraft display with a controller based on map data retrieved from a memory in communication with the controller, the map data including geographic information and predetermined obstacle information;
   receiving one or more textual communications from a remote server with a receiver in communication with the controller, wherein the one or more textual communications include textual information indicating obstacle coordinates for an object; and
   updating the electronic map to include one or more symbolic representations based on obstacle data derived from the one or more textual communications by generating a symbolic representation that overlays or at least partially surrounds the obstacle coordinates on the electronic map, wherein the symbolic representation at least partially surrounds a preexisting symbolic representation on the electronic map when the map data includes predetermined obstacle information for the object.

15. The method of claim 14, wherein the electronic map comprises at least one of a two-dimensional moving map, a three-dimensional moving map or a synthetic vision moving map.

16. The method of claim 14, wherein the electronic map is referenced to at least one of a predetermined reference point, a selected reference point, a reference point on the aircraft, a pilot point of view, or an unmanned aerial vehicle point of view.

17. The method of claim 14, wherein the one or more textual communications comprise notice to airmen (NOTAM) communications.

18. The method of claim 14, wherein the one or more textual communications further include textual information indicating at least one of obstacle elevation, type of obstacle, or obstacle status for the object.

19. The method of claim 14, wherein the symbolic representation is selectable to view at least one of the one or more textual communications or the obstacle data derived from the one or more textual communications for the object.

20. The method of claim 14, wherein the aircraft display comprises at least one of a primary flight display, a multi-function aircraft display, or an unmanned aerial vehicle controller display.

* * * * *